United States Patent [19]

Turi

[11] Patent Number: 5,009,831
[45] Date of Patent: Apr. 23, 1991

[54] EXTRUSION COATED SUBSTRATES WITH SEPARABLE AND REMOVABLE LAYERS

[75] Inventor: Eran Turi, Springfield, Mass.

[73] Assignee: Union Camp Corporation, Wayne, N.J.

[21] Appl. No.: 363,828

[22] Filed: Jun. 9, 1989

[51] Int. Cl.$^5$ .............................................. B29C 47/06
[52] U.S. Cl. ..................... 264/510; 156/244.11; 264/556; 264/557; 264/216; 264/237; 264/171; 264/145; 425/224
[58] Field of Search ............... 264/556, 557, 237, 348, 264/145, 216, 169, 85, 510; 425/224; 156/244.11, 244.14, 500

[56] References Cited

U.S. PATENT DOCUMENTS

| | | | |
|---|---|---|---|
| 2,944,586 | 7/1960 | Yanulis | 156/500 |
| 3,340,124 | 9/1967 | Lowe et al. | 156/244.11 |
| 3,356,556 | 12/1967 | Violette et al. | 264/146 |
| 3,402,086 | 9/1968 | Smith et al. | 156/244.11 |
| 3,470,055 | 9/1969 | Wade | 156/500 |
| 3,930,923 | 1/1976 | Elliott | 264/556 |

FOREIGN PATENT DOCUMENTS

| | | | |
|---|---|---|---|
| 2053722 | 5/1971 | Fed. Rep. of Germany | 156/244.11 |
| 45-18228 | 6/1970 | Japan | 264/216 |
| 57-41916 | 3/1982 | Japan | 156/244.11 |
| 58-25927 | 2/1983 | Japan | 264/169 |
| 62-207624 | 9/1987 | Japan | 264/237 |

Primary Examiner—Jeffery Thurlow
Attorney, Agent, or Firm—Edward J. Sites

[57] ABSTRACT

Processes for extruding thermoplastic coatings on substrates are provided by this invention. The processes include directing a substrate between two pressure roll means wherein one of the pressure roll means has a temperature less than the melting point of the thermoplastic. Next, the processes include providing a molten curtain of thermoplastic which is then directed with a current of a fluid medium, such as compressed air, so as to cause at least a first portion of the molten curtain to contact the first pressure roll means for a time sufficient to form a thermoplastic sheet. Next, the processes include extruding at least this thermoplastic sheet with the substrate between the two pressure roll means so as to form an extruded substrate having a thermoplastic layer which is separable from the substrate.

15 Claims, 2 Drawing Sheets

EXTRUSION COATED SUBSTRATES WITH SEPARABLE AND REMOVABLE LAYERS

FIELD OF THE INVENTION

This invention relates to improvements to methods for coating substrates with films of uniform thickness, and more particularly, to more efficient methods of achieving selvedge.

BACKGROUND OF THE INVENTION

Extrusion coating of substrates for producing plastic-coated products generally involves the application of a liquid curtain of thermoplastic resin into the nip of a pair of pressure rolls which press a thin, relatively uniform, thermoplastic coating against the substrate. See U.S. Pat Nos. 3,340,124, 3,356,556 and Japan Sho-47-46264. As these disclosures suggest, extrusion coating of paper is often concerned with providing or achieving selvedge. "Selvedge" is the term used for the uncoated portion along the edge of selected papers. The uncoated edge is valuable in the making of tubes and other configurations, since it can be easily glued. Another popular use is the fastening of one sheet to another in the manufacture of plastic-coated paper bags.

Those skilled in the art of paper manufacturing have demonstrated a desire for a manufacturing method capable of producing a selvedge edge which has an even coating of plastic at its delineation. It is known that the edge of an extruded sheet of a plastic laminant is sometimes thickened into a bead, resulting in a defect in the coated paper. One way of avoiding this beaded or uneven surface is to spray liquid onto areas of the base sheet substrate to prevent adhesion of the irregular plastic edge. See Japan Sho-47-46264. This reference further teaches the use of a knife for cutting unadhered plastic in a machine direction.

Others have achieved selvedge by splitting the molten curtain with an electrical hotwire and thereafter preventing adhesion by using an interlayer belt disposed between the plastic and substrate. See U.S. Pat. Nos. 3,340,124 and 3,356,556. These references further teach the use of a chill roll disposed to contact the thermoplastic curtain upon extrusion. These chill rolls are employed primarily to provide the necessary release of the plastic film after extrusion. See, e.g., col. 3 of U.S. Pat. No. 3,356,556.

Although these prior art methods and apparatus have been useful in applying layers of thermoplastic material to paper substrates, there still remains a need for a facilitated method for controlling the level of adhesion between a plastic coating and a base sheet substrate for providing selvedge and for minimizing imperfections in the plastic coating.

SUMMARY OF THE INVENTION

This invention provides methods for coating substrates with a separable and removable layer of thermoplastic whereby a molten curtain of thermoplastic material of a conventional extrusion coating process is directed by a current of a fluid medium, such as a liquid or gas, so as to cause at least a first portion of the molten curtain to contact a first pressure roll means, preferably a chilled roll. This causes the first portion of the molten curtain to substantially solidify to form a thermoplastic sheet which can be combined with the substrate between a pair of pressure roll means to form an extrusion coated substrate having a thermoplastic layer which is separable and removable from the substrate. As used herein, the term "substantially solidify" refers to solids as well as semi-solid thermoplastic materials. The term "separable" means that the thermoplastic layer can be mechanically removed from the substrate without significantly damaging it.

It has been discovered that a compressed gas, e.g. air, was found to be effective in driving the molten plastic curtain against a chilled metal roll during extrusion coating. A separable thermoplastic layer resulted which could be subsequently removed, e.g. by cutting or heating, to achieve selvedge. The processes of this invention can favorably be employed in the manufacture of tubing, plastic pockets on substrates, peelable areas for limited opening of packages, and plastic tabs for heat sealing. The process also offers routine recycling of thermoplastic trim without paper contamination. These novel methods are desirable because they have the capability of eliminating pressure roll "wrap-ups", because the edge of the curtain can be designed to not adhere to the rubber covering of conventional pressure rolls.

Accordingly, novel processes for extrusion coating substrates with thermoplastic layers are provided which can be implemented into standardized equipment with minimal capital expense. It is expected that a directed stream of compressed air can be supplied by disposing one or more nozzles directed at the molten curtain near the nip, and preferably within one foot, of conventional pressure and chill rolls.

It is, therefore, an object of this invention to provide a thermoplastic extrusion process for manufacturing substrates which is inexpensive, yet achieves reliable selvedge.

It is another object of this invention to provide a thermoplastic layer on substrates which is separable and removable from the substrate.

With these and other objects in view, which will become apparent to one skilled in the art as the description proceeds, this invention resides in the novel construction, combination, arrangement of parts and methods substantially as hereinafter described and more particularly defined in the attached claims.

BRIEF DESCRIPTION OF THE DRAWINGS

The accompanying drawings illustrate preferred embodiments of the invention according the practical application of the principles thereof, and in which.

DESCRIPTION OF THE INVENTION

The preferred operable embodiments of this invention will now be described. In one process embodiment, a substrate is directed between two pressure roll means, a first of the pressure roll means has a temperature of less than the melting point of the thermoplastic. The process further includes the step of providing a molten curtain of the thermoplastic and then directing this molten curtain with a current of a fluid medium so as to cause at least a first portion of the molten curtain to contact the first pressure roll means for a time sufficient to substantially solidify the first portion to form a thermoplastic sheet. Finally, the process includes combining at least the thermoplastic sheet with the substrate between the two pressure roll means so as to form an extrusion coated substrate having a thermoplastic layer which is separable from the substrate.

In another preferred process of this invention, a substrate is directed between two pressure rolls, a first of these pressure rolls has a sub-ambient temperature. This process further includes the step of providing a molten curtain of a thermoplastic and then directing this molten curtain with a flow of gas so as to cause at least a first portion of the molten curtain to contact the first pressure roll for a time sufficient to substantially solidify this first portion to form a thermoplastic sheet. This embodiment further includes the step of combining the thermoplastic sheet and a second portion of the molten curtain with the substrate between the two pressure rolls to form an extrusion coated substrate having both separable and adhering thermoplastic layers thereon.

In an even more detailed embodiment of this invention, a substrate is directed between a pair of pressure rolls, one of which has a temperature below about 65° F. and a diameter greater than that of the second of the pressure rolls. This embodiment further includes the steps of providing a molten curtain of the thermoplastic and then separating this molten curtain into at least a first and a second portion. This embodiment also includes the step of directing the first portion of the molten curtain with a current of a compressed gas so as to cause the first portion to contact the first pressure roll for a time sufficient to substantially solidify the first portion into a thermoplastic sheet. Finally, this process includes the step of combining the thermoplastic sheet along with the second portion of the molten curtain between the two pressure rolls whereby the thermoplastic sheet becomes releasably adhered to the substrate and the second portion of the molten curtain becomes a substantially integral thermoplastic layer on the substrate (e.g., adhering to said substrate and not easily peeled off).

Figure 1:
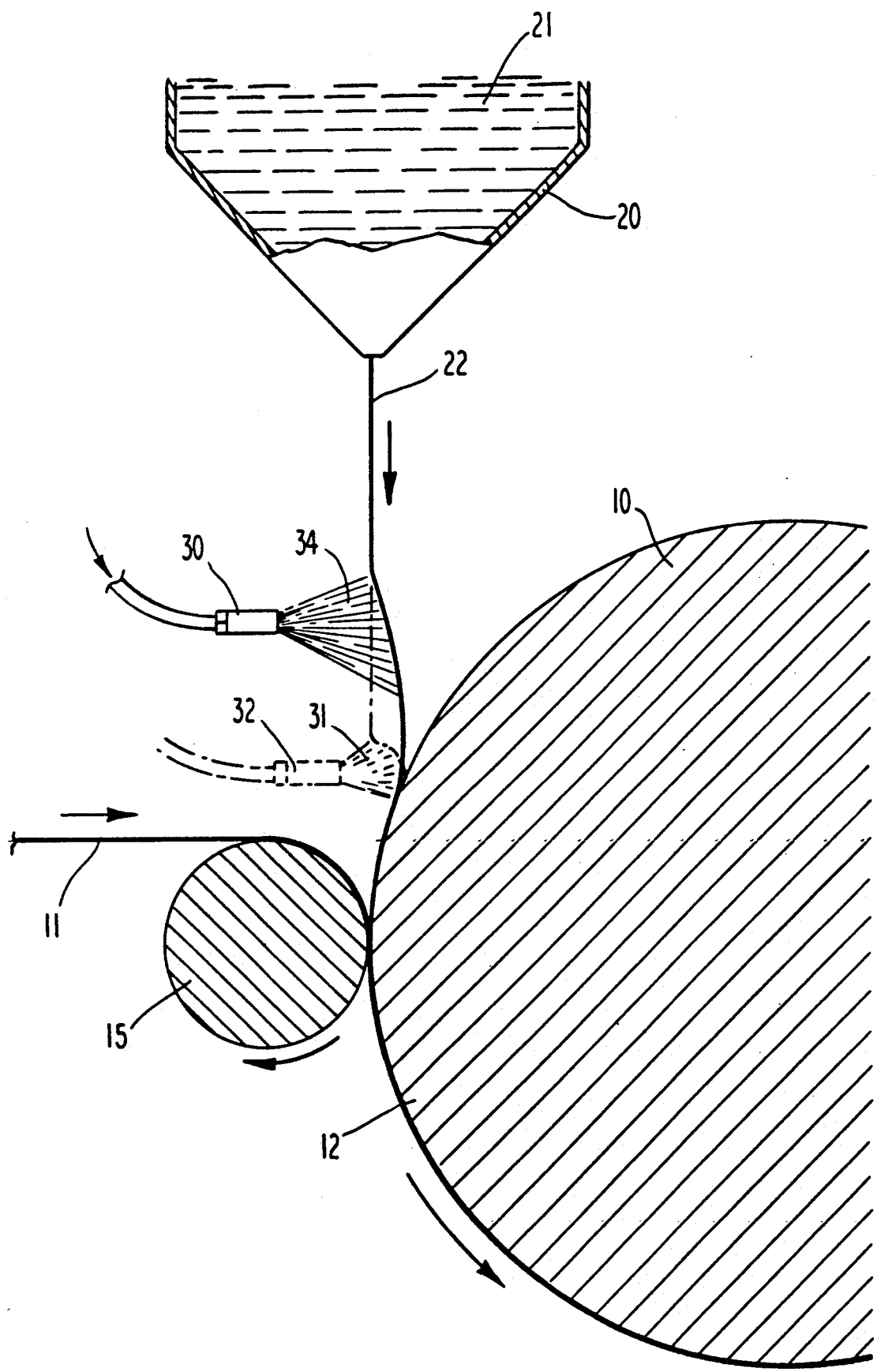
FIG. 1 is a diagrammatic view of the apparatus of the preferred method illustrating the locations of two preferred nozzle designs.

Referring now to the Figures, and particularly to FIG. 1 thereof, there is shown a diagrammatic view of a conventional extrusion coating apparatus, with the exception of the addition of compressed gas nozzles 30 or 32. It is understood that those of ordinary skill in the paper-coating art will adapt the principles and teachings of this invention to their own coating equipment without difficulty. Such conventional apparatus are disclosed in U.S. Pat. Nos. 3,340,124 and 3,356,556, which are hereby incorporated by reference.

As described in FIG. 1, a trough 20 is provided with a molten bath of thermoplastic 21. The trough 20 includes a cross-machine direction slit which provides a molten curtain 22 of thermoplastic material, which descends from the trough 20 with the help of gravity. A substrate 11, which can comprise any number of materials, such as paper, plastic, paperboard, foil is fed, preferably from a roll, onto a pressure roll means, preferably pressure roll 15. It is understood that although conventional rolls are illustrated and discussed herein, multiple pressure rolls, belts, and other similar apparatus could be effectively employed.

Figure 2:
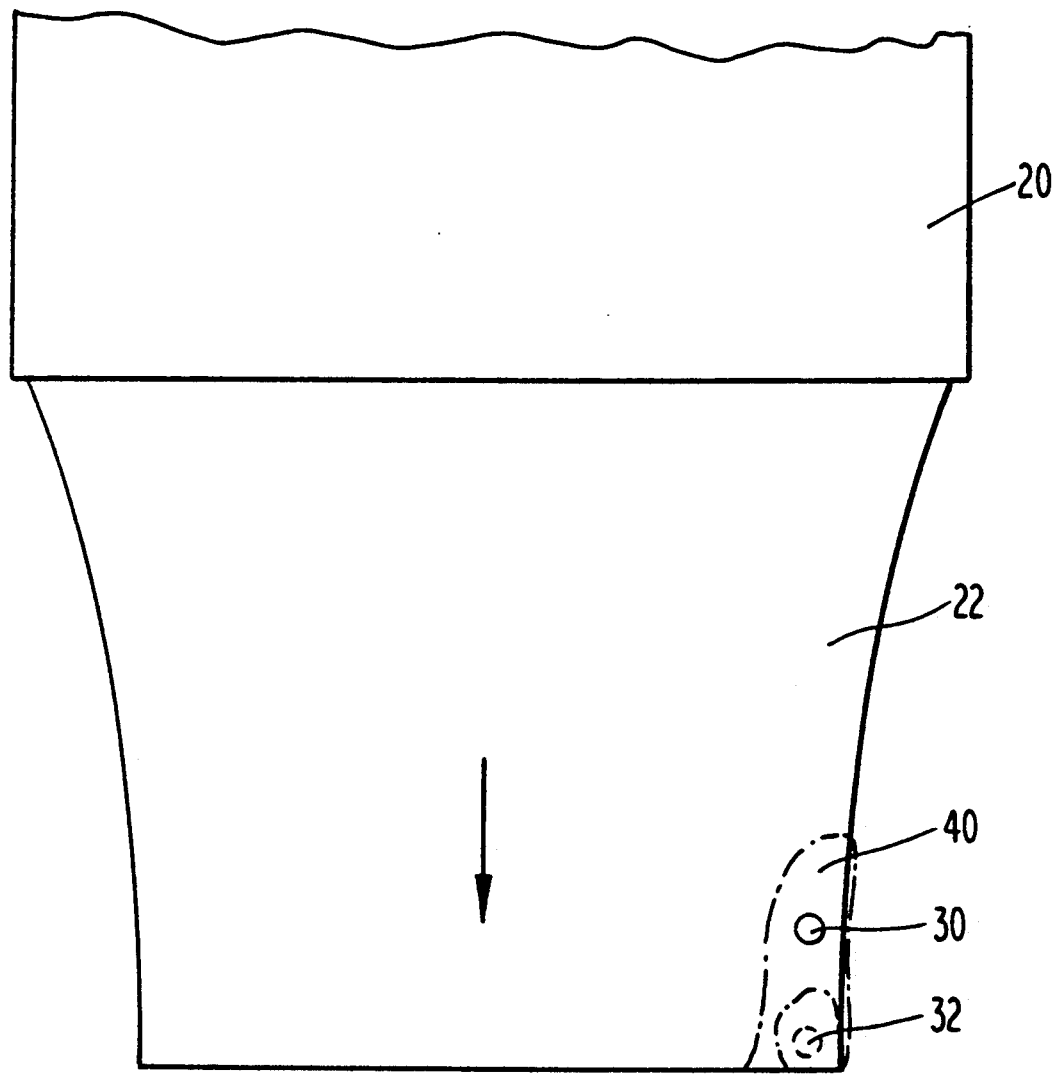
FIG. 2 is a side elevation of a molten thermoplastic curtain of FIG. 1, illustrating two resulting contact areas between the molten curtain and the preferred chill roll.

The molten curtain 22 of thermoplastic material descends from the trough 20 until it is met by a current of a fluid medium, preferably a flow of gas, and more preferably compressed air. This current of a fluid medium is directed by nozzles 30 or 32 which are preferred alternative embodiments for directing the molten curtain 22 onto the first pressure roll means, preferably chilled roll 10, so as to substantially solidify at least a portion of the molten curtain to form a thermoplastic sheet, described generally as surface 40 in FIG. 2.

A principal component of this invention is the use of a preferred airline with one or more nozzles pointed at selected areas of the molten curtain 22 that are desired to be solidified by cooling. Preferably these nozzles include a dispersing angle such that the fluid medium or gas is spread out over a larger surface area. This will exert less force per unit area on the molten curtain 22 as it is contacted with the preferred chill roll 10. It is known that the location of the current of fluid medium has an affect on the curtain stability. Generally, as the nozzle location is moved closer to the nip of the preferred pressure rolls 15 and 10, curtain stability is less affected. Consequently, disposing the nozzle within one foot of the nip is preferred. Nozzle 32 with its gaseous flow 31 would therefore produce a more stable molten curtain than nozzle 30 with its gaseous flow 34.

In more detailed alternative embodiments of this invention, the adhesion of selected areas of the thermoplastic material can be carefully controlled by varying air pressure and speed, changing nozzle positioning and nozzle type, as well as controlling the air temperature and the surface of the rolls 10 and 15. It is understood that the molten curtain could be carefully controlled by curtain deflection, varying the contact point on the chill roll, air cooling or directing the air pressure on the curtain to compress against the chill roll. These are but a few processes and apparatus parameters which are included as part of the concept of this invention.

It is further envisioned that this novel process could produce various configurations of separable and adhering thermoplastic layers on the substrate 11. For instance, a portion of the molten curtain not affected by the current of fluid medium could be applied by the pressure rolls to form a substantially adhering thermoplastic layer on the substrate 11. Alternative separable and adhering layers can be disposed side-by-side on the substrate or in any other desired geometry or configuration. Additionally, the molten curtain could be split, e.g. using the art recognized hot wire technique, so that at least two portions of the molten curtain 22 would result. A first of these two portions could be directed by the gaseous flow onto the chill roll 10, while the second of these portions can be fed directly into the nip of the pressure rolls whereupon it would be substantially permanently affixed to the substrate 11. The nozzle configurations can be selected to provide a plurality of gas streams disposed to direct the molten curtain at a plurality of locations for providing a myriad of adhering and releasable thermoplastic coatings.

The thermoplastics of this invention preferably include polyethylene and its forms, e.g., low, medium or high density polyethylene. The chill roll 10 should have a sufficient circumference and a low enough temperature to sufficiently cool the thermoplastic curtain prior to application of the pressure roll 15. Preferably, the chill roll has a temperature within the range of 32° F. to about 130° F., although for polyethylene a temperature which is subambient, and preferably less than about 65° F. is preferred.

The extrusion coated substrate 12 can later be sent to a cutting process such as those known to the art for achieving selvedge. If hot wire splitting of the molten curtain 22 is not employed, prior to extrusion, a simple knife cutting procedure would provide acceptable uncoated margins.

From the foregoing, it can be realized that this invention provides processes for extrusion coating substrates with films of thermoplastic materials. Although various embodiments have been illustrated, this was for the purpose of describing, but not limiting the invention. Various modifications, which will become apparent to one skilled in the art, are within the scope of this invention described in the attached claims.

I claim as my invention:

1. A process for extrusion coating a substrate with a thermoplastic layer which is separable from said substrate, comprising:
   (a) directing said substrate between two pressure roll means, a first of said pressure roll means having a temperature of less than the melting point of said thermoplastic;
   (b) providing a molten curtain of said thermoplastic;
   (c) directing said molten curtain of said thermoplastic with a current of a fluid medium so as to cause at least a first portion of said molten curtain to contact said first pressure roll means for a time sufficient to substantially solidify said first portion to form a thermoplastic sheet; and
   (d) combining at least said thermoplastic sheet with said substrate between said two pressure roll means so as to form an extrusion coated substrate having a first thermoplastic layer portion which is separable from said substrate said first thermoplastic layer portion comprising said solidified first portion of said molten curtain.

2. The process of claim 1 wherein said fluid medium is pressurized air.

3. The process of claim 1 wherein said combining step (d) further comprises combining a second portion of said molten curtain with said substrate between said two pressure roll means so as to form a substantially adhering second thermoplastic layer portion on said substrate.

4. The process of claim 3 wherein said separable thermoplastic layer and said adhering thermoplastic layer are disposed side-by-side on said substrate.

5. The process of claim 4 wherein each of said two pressure roll means comprises a pressure roll.

6. The process of claim 5 further comprising the step of splitting said molten curtain prior to said directing step (c).

7. The process of claim 3 wherein said first pressure roll means has a sub-ambient temperature.

8. The process of claim 6 wherein said first pressure roll means has a temperature of less than about 65° F.

9. The process of claim 7 wherein said directed current of a fluid medium comprises a dispersing flow of pressurized gas.

10. A process for extrusion coating a substrate with a thermoplastic layer having separable and adhering portions, comprising:
    (a) directing said substrate between two pressure rolls, a first of said pressure rolls having a sub-ambient temperature;
    (b) providing a molten curtain of said thermoplastic;
    (c) directing said molten curtain of said thermoplastic with a flow of gas so as to cause at least a first portion of said molten curtain to contact said first pressure roll for a time sufficient to substantially solidify said first portion to form a thermoplastic sheet; and
    (d) combining said thermoplastic sheet and a second portion of said molten curtain with said substrate between said two pressure rolls to form an extrusion coated substrate having both separable and adhering thermoplastic layers thereon, said separable thermoplastic layer comprising said thermoplastic sheet.

11. The process of claim 10 wherein said thermoplastic comprises polyethylene.

12. The process of claim 11 wherein said first pressure roll comprises a larger circumference than the second of said pressure rolls.

13. The process of claim 10 wherein said flow of gas comprises a plurality of gas streams disposed to direct said molten curtain at a plurality of locations.

14. The process of claim 10 wherein said flow of gas contacts said molten curtain within one foot of the nip of said pressure rolls.

15. A process for extrusion coating a substrate with a thermoplastic layer having separable and adhering portions, comprising:
    (a) directing said substrate between a pair of pressure rolls, a first of said pressure rolls having a temperature below about 65° F. and having a diameter greater than that of a second of said pressure rolls;
    (b) providing a molten curtain of said thermoplastic;
    (c) separating said molten curtain into at least a first and second portion;
    (d) directing said first portion of said molten curtain with a current of a gas so as to cause said first portion to contact said first pressure roll for a time sufficient to substantially solidify said first portion into a thermoplastic sheet; and
    (e) combining said thermoplastic sheet along with said second portion of said molten curtain between said two pressure rolls whereby said thermoplastic sheet becomes releasably adhered to said substrate and said second portion of said molten curtain becomes a substantially integral thermoplastic layer on said substrate.

* * * * *